United States Patent [19]

Cappellari et al.

[11] Patent Number: 5,557,611
[45] Date of Patent: Sep. 17, 1996

[54] ATM CROSS-CONNECT NODE UTILIZING TWO PASSES THROUGH THE CONNECTION NETWORK WITH SHAPING BETWEEN PASSES FOR OPTIMAL RESOURCE ALLOCATION IN A BURSTY ENVIRONMENT

[75] Inventors: Antonio Cappellari, Beinasco; Paolo Coppo; Matteo D'Ambrosio, both of Turin; Vinicio Vercellone, Venaria, all of Italy

[73] Assignee: CSELT - Centro Studi E Laboratori Telecomunicazioni S.p.A., Turin, Italy

[21] Appl. No.: 503,968

[22] Filed: Jul. 19, 1995

[30] Foreign Application Priority Data

Jul. 26, 1994 [IT] Italy .................. TO94A0615

[51] Int. Cl.⁶ ........................ H04L 21/56; H04Q 11/04
[52] U.S. Cl. ...................... 370/60.1; 370/17; 370/94.1
[58] Field of Search ................... 370/54, 55, 58.1, 370/60, 60.1, 61, 94.1, 17, 94.2, 85.7

[56] References Cited

U.S. PATENT DOCUMENTS

| | | | |
|---|---|---|---|
| 5,168,492 | 12/1992 | Beshai et al. | 370/60.1 |
| 5,287,346 | 2/1994 | Bianchini, Jr. et al. | 370/60 |
| 5,402,415 | 3/1995 | Turner | 370/60 |
| 5,416,769 | 5/1995 | Karol | 370/60 |
| 5,432,783 | 7/1995 | Ahmed et al. | 370/60.1 |

OTHER PUBLICATIONS

"Broadband Virtual Provate Networks and Their Evolution", S. M. Walters et al, XIV International Switching Symposium, Yokahama(Japan), 25–30 Oct. 1992, 5 pages.
"Traffic Control/And/Congestion Control in B–ISDN, ITU–T Recommendation I.371", Helsinki 1993, pp. 1–22.
"B–ISDN ATM Adaptation Layer (AAL) Specification", ITU–Recommendation I.363, Geneva 1991, pp. 1–14.

Primary Examiner—Douglas W. Olms
Assistant Examiner—Matthew C. Phillips
Attorney, Agent, or Firm—Herbert Dubno

[57] ABSTRACT

A flow of ATM cells to be cross-connected performs two consecutive passes through the connection network (PX) of a node. In the first pass the virtual channels of the input virtual paths (A, B, C) are distributed among intermediate virtual channel bundles (A' . . . C''') each with an overall peak bandwidth equal to that of the virtual path of origin of its contributing channels; between the first and the second pass, the virtual channels are cross-connected and the related cells are temporarily memorized, and at the same time the cell flow to be associated to an output virtual path is shaped; and in the second pass the virtual paths are cross-connected, Temporary memorization and shaping are accomplished in a device (SMS) connected between the outputs and the inputs of the connection network (PX) of the node.

13 Claims, 7 Drawing Sheets

ATM CROSS-CONNECT NODE UTILIZING TWO PASSES THROUGH THE CONNECTION NETWORK WITH SHAPING BETWEEN PASSES FOR OPTIMAL RESOURCE ALLOCATION IN A BURSTY ENVIRONMENT

FIELD OF THE INVENTION

The invention described herein relates to ATM networks and, more particularly to a method for the optimal resource allocation for the transport of variable-bandwidth data flows in one such networks, and a cross-connect node which utilizes the method.

BACKGROUND OF THE INVENTION

In the last few years, there has been an ever-growing development of high-performance data communications, in terms of both bit rate and quality of service. Some examples are in computer communications, for distributed data processing, for access to distributed information, etc. The introduction of local area network technology represents one of the factors that have made possible this development, and these networks have spread rapidly and continually to the most disparate sectors, often becoming the support for all data communications services within companies. Location of the various offices of the same company in different cities or even different countries gives rise to the problem of interconnecting the various local communications resources.

The commonly adopted solution to this problem entails the realization of private networks based on the use of leased dedicated lines. However, the data traffic generated in the interconnection of local area networks has a typically bursty (or variable-bandwidth) profile; this may lead to a scarcely efficient and flexible use of dedicated resources, so that it may be difficult to amortize the cost involved, which is quite high. A possible alternative could be the use of high bit-rate ATM networks, which are particularly well suited to deal with variable bandwidth traffic and also constitute, for the user, a more economical option than leased lines. In particular, the public operator of the ATM network could provide a broadband virtual private network within the public network.

The paper "Broadband Virtual Private Networks and Their Evolution", presented by S. M. Walters and M. Ahmed at the XIV International Switching Symposium, Yokohama (Japan), 25–30 Oct. 1992, describes a possible structure for a virtual private network, based on the principle of separation between bandwidth allocation and connectivity among "users", indicating with this term not only the actual user terminals but also the various networks to be connected. In other words, it is proposed to realize point-to-point connections between users through virtual channels, without associating any bandwidth characteristic to these channels; bandwidth allocation is performed at the virtual path level. (Note that virtual channels are the lowest multiplexing level in an ATM network and virtual paths are the next higher level). Within a node, virtual channels belonging to different incoming virtual paths must be multiplexed into output virtual paths. Thus the need arises:

a) to apply a statistical multiplexing criterion which allows assigning the bandwidth to output virtual paths in an optimal way; and b) to guarantee at the same time that the sum of the flows of the different virtual channels constituting the outgoing virtual path never exceeds the bandwidth assigned to it.

In a network exploiting separation between connectivity and bandwidth allocation, the immediate solution for these problems could be:

performing first a cross-connection of the virtual channels, allocating each incoming virtual channel (or all of the virtual channels of the same incoming virtual path that are to be cross-connected to the same outgoing virtual path) its peak bandwidth, which could be that of the virtual path to which it belongs. In general therefore, each outgoing virtual path is allocated a bandwidth equal to the sum of the bandwidths of its contributing virtual paths, i.e. a bandwidth equal to $\Sigma W_i$ (i=1,2 ... m), where m is the number of contributing virtual paths with bandwidth $W_i$, although on average incoming traffic has a much smaller bandwidth;

policing the traffic egressing from the node in order to assign in the network a peak bandwidth $W_u < \Sigma W_i$ to the outgoing virtual path; and cross-connecting and multiplexing, on high utilization network lines, virtual paths with peak bandwidth $W_u$.

With this solution, however, there is an inefficient allocation of bandwidth resources within the node during the virtual channel cross-connection phase. In fact, with an incoming flow that on average will be equal to the desired outgoing peak bandwidth, it is necessary to allocate a bandwidth equal to $\Sigma W_i$ on the output ports of the node, with severe waste of the cross-connect internal resources. To solve this problem, resource-assignment mechanisms collectively known as FRM (Fast Resource Management) have been proposed; however, they have problems or limitations if applied to the case of highly bursty data sources.

OBJECT OF THE INVENTION

The object of the invention is to provide a method which allows an optimal utilization of network resources and guarantees an adequate performance level on message transfer, in the presence of data flows characterized by a highly irregular traffic profile.

SUMMARY OF THE INVENTION

According to the invention, a method is provided, which is applied to data flows composed of ATM cells carried along the network through virtual channels grouped into virtual paths, and in which a peak bandwidth is assigned to the virtual paths during the connection set-up and, in correspondence with each node, traffic is policed at the node input and output, to prevent traffic coming from different virtual paths and directed to the same virtual path egressing the node from exceeding the node capacity, and the traffic itself is shaped, to render the emission of cells related to a given virtual path as uniform as possible. According to the invention, the flow of ATM cells makes two consecutive passes through the node connection network, such that in the first pass the virtual channels of the input virtual paths are distributed among intermediate bundles of virtual channels each with an overall peak bandwidth equal to the bandwidth of the virtual path of origin of the contributing channels. Between the first and the second pass, a cross-connection of the virtual channels and a temporary memorization of the related cells is performed, by introducing such cells in service queues associated with the output virtual paths, together with a shaping of the cell flow to be associated with an output virtual path. In the second pass a virtual path cross-connection is performed, to multiplex the output virtual paths on the node output lines. For such temporary memorization, messages are accepted in the service queues only if a threshold for the length of the respective queue has not been exceeded or, if the threshold has been exceeded, only if they are high priority messages.

Advantageously, temporary memorization and shaping are realized in a device inserted between the outputs and the inputs of the node connection network. Depending on whether such device comprises a single unit, capable of building all the node output virtual paths, or a number of units each building a part of these output virtual paths, the intermediate bundles of virtual channels built in the first cross-connection phase shall be obtained by cross-connecting the input virtual channels, or by cross-connecting both virtual paths and virtual channels, in such a way that all the virtual channels that are to be transferred to the output virtual paths served by a unit reach the unit itself.

Preferably, to shape the cell flow, each virtual path active on a node output is allocated an overall bandwidth, which is a multiple of an elementary bandwidth, and the cells of the corresponding queue are read according to a frame formed by a number of time intervals equal to the number of elementary bandwidths necessary to form the overall bandwidth.

The invention also provides a node in which the cross-connection is accomplished according to the above method, the node including a connection network and means for the temporary memorization of the cells to be routed along the output virtual paths and for traffic shaping, to render the emission of cells related to a given virtual path as uniform as possible. The means for temporary memorization and traffic shaping are connected between a group of outputs and a group of inputs of the connection network and are arranged to:

handle ATM cell flows that have already undergone a first cross-connection phase in the connection network, during which phase the virtual channels of the input virtual paths are distributed among intermediate virtual channel bundles, each having an overall peak bandwidth equal to that of the virtual path of origin of the contributing channels;

cross-connect virtual channels to form shaped and policed virtual paths to be reintroduced into the connection network, where they undergo a second cross-connection phase in order to be transferred to the node output lines; and carry out traffic shaping at the virtual channel level by selectively discarding cells at the message level, whereby messages are accepted in service queues associated with the output virtual paths only if a length threshold for the respective queue has not been exceeded or, if the threshold has been exceeded, only if the messages have a high priority.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
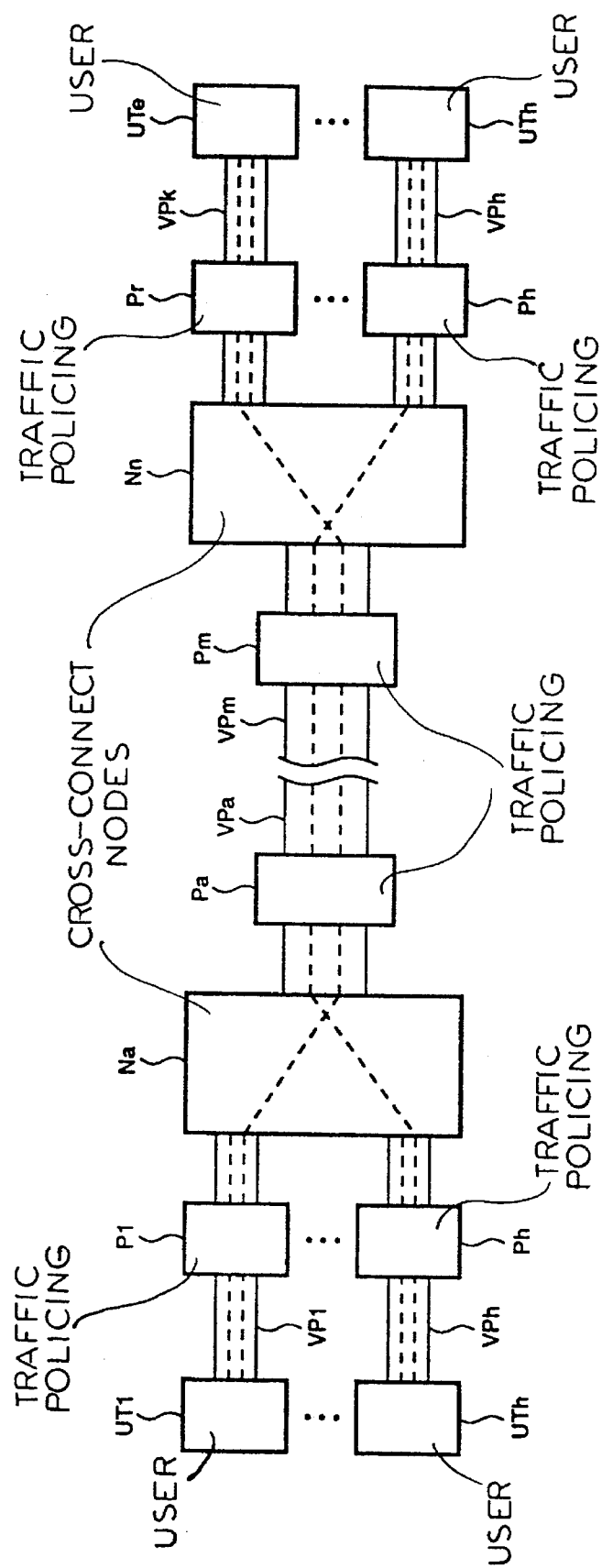
FIG. 1 is a schematic diagram of a virtual private network using the ATM technique.

With reference to FIG. 1, an ATM network has been represented with a certain number of users UT1 . . . UTh, UTk . . . UTn and a certain number of cross-connect nodes Na . . . Nm. In the preferred application of the invention to the realization of a virtual private network service, the "users" can be, for instance, local area networks supporting the communication services of different branches of the same company. ATM cells into which a data transmission is organized leave the users or reach the users through virtual channels; virtual channels are then grouped according to certain logical criteria into virtual paths VP1 . . . VPh, VPk . . . VPn. In the drawing, virtual channels are indicated in dashed lines within virtual paths. For the sake of simplicity, only one virtual path VPa outgoing from Na and only one virtual path VPm entering Nm have been indicated. Moreover, in the Figure, the association between the various virtual channels and the physical links over which they are physically conveyed has not been considered.

To accomplish the separation between connectivity and bandwidth allocation, as described in the aforementioned paper by S. M. Walters and M. Ahmed, the same virtual path VP1 . . . VPh, VPk . . . VPn will group, for example, all virtual channels outgoing from a user or respectively directed to a user. It is up to the user to manage the virtual channel bandwidth within a virtual path. Advantageously, such management is based on statistical multiplexing criteria (i.e. the bandwidth allocated to the different virtual channels of a virtual path varies dynamically so that in the whole the peak bandwidth of the virtual path is never exceeded) because this provides a saving on the bandwidth assigned to the virtual paths. The network nodes will instead control (or "police") traffic at the virtual path level: in particular, traffic will be policed at both the input and the output of the node (blocks P1 . . . Ph, Pa, Pm, Pk . . . Pn) to prevent traffic coming from several input virtual paths and directed to the same output virtual path from exceeding the capacity of the latter. Traffic policing is a conventional function in ATM networks and it essentially consists in discarding a part of the cells when the bandwidth required for a virtual path exceeds the bandwidth established for it. This function is described for instance in ITU-T recommendation I.371.

Figure 2:
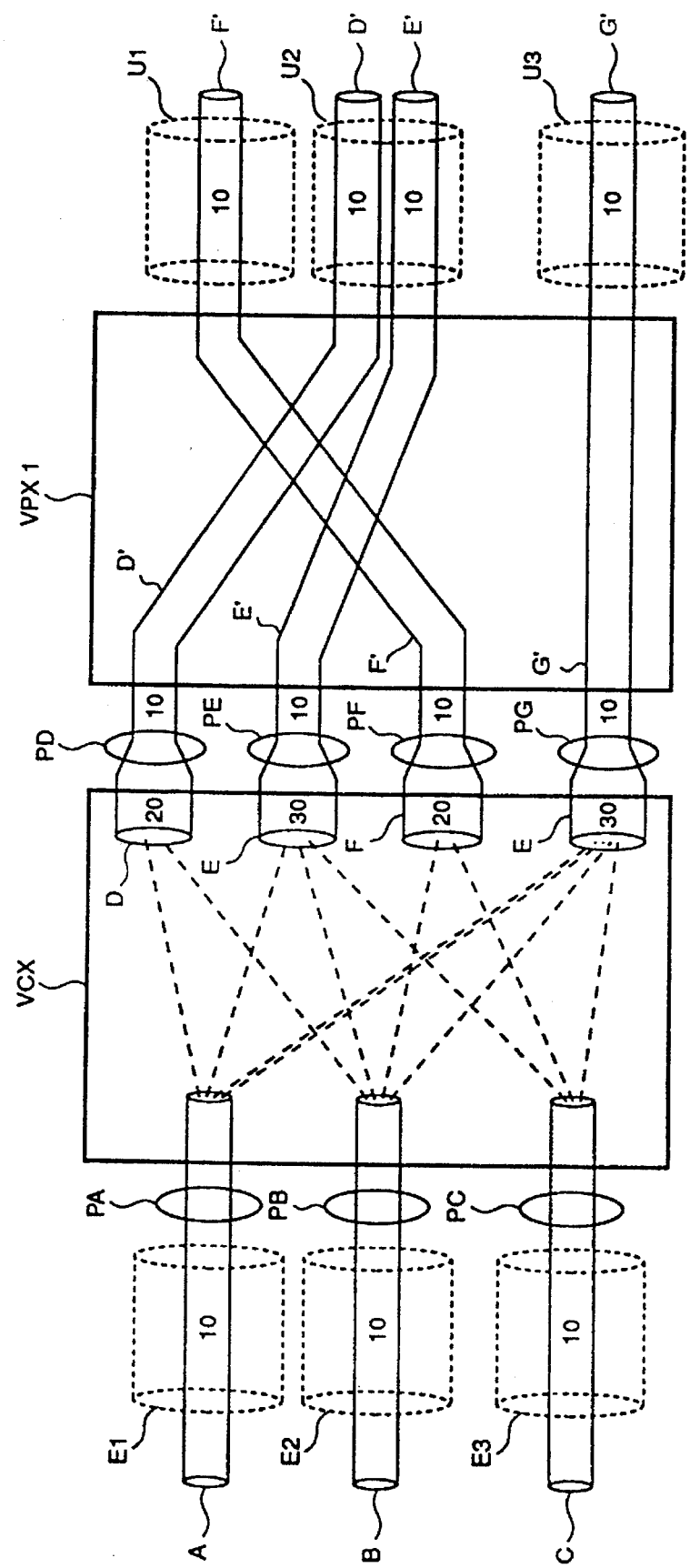
FIG. 2 is a logic diagram of a cross-connect node of the network in FIG. 1, which illustrates the problem to be solved with the invention.

FIG. 2 is a logic diagram of the operations of a generic node N in the network of FIG. 1, when cross-connection of virtual channels and paths occurs with the criterion described in the introduction. A certain number of virtual paths enter the node (three in the example illustrated, indicated with A, B, C and belonging to different input links E1, E2, E3), and each virtual path is associated with a peak bandwidth Wi, indicated within the respective representative element. By way of non-limiting example, peak bandwidth is assumed to be the same (10 Mbit/s) for all virtual paths. The node has to cross-connect the virtual channels belonging to the different input virtual paths and to form output virtual paths D', E', F', G': those paths are conveyed by three output links U1 (path F'), U2 (D', E'), U3 (G') and each of them is allocated a bandwidth Wu which, again by way of non-limiting example, is assumed to be equal for all paths and equal to that of the input virtual paths. Cross-connection takes place in two phases, schematically shown by the node subdivision into the two blocks VCX, VPX1. In the first phase, node N acts only as a virtual channel cross-connect and redistributes the channels present in paths A, B, C among a group of intermediate virtual paths D, E, F, G. Each incoming channel (or each group of incoming channels that are to be transferred to the same output virtual path) is allocated its own peak bandwidth, assumed to be equal to that of the virtual path to which the channel belongs. The devices for policing traffic entering the node (represented by ellipses PA, PB, PC) ensure the peak bandwidth available in the virtual path is not exceeded. Each of the virtual paths D–G is allocated, as stated above, a bandwidth equal to the sum of the bandwidths of the contributing virtual paths. It is evident that there is a high bandwidth requirement with poor utilization: in fact, for an input flow that in the example is, on average, 10 Mbit/s, it is necessary to provide 20 or 30 Mbit/s on the output ports of the node (i.e. on the physical lines conveying virtual paths D–G), with severe waste of the cross-connect internal resources. Virtual paths D, E, F, G are associated with output traffic policing devices (ellipses PD, PE, PF, PG) to limit the peak bandwidth of these virtual paths to the desired value (10 Mbit) for the output virtual paths. Thus virtual paths D'–G' are formed: their peak bandwidth is Wu and, in the second phase, they are made to go back into the node where they are cross-connected and multiplexed on high utilization network lines U1 ... U3. The node in this phase acts as a virtual path cross-connect VPX1. The problem that may arise in this second phase is that a policing device used alone attributes the responsibility for a correct bandwidth utilization to the sources taken as a whole, which may be difficult to realize as the sources are independent of each other.

Figure 3:
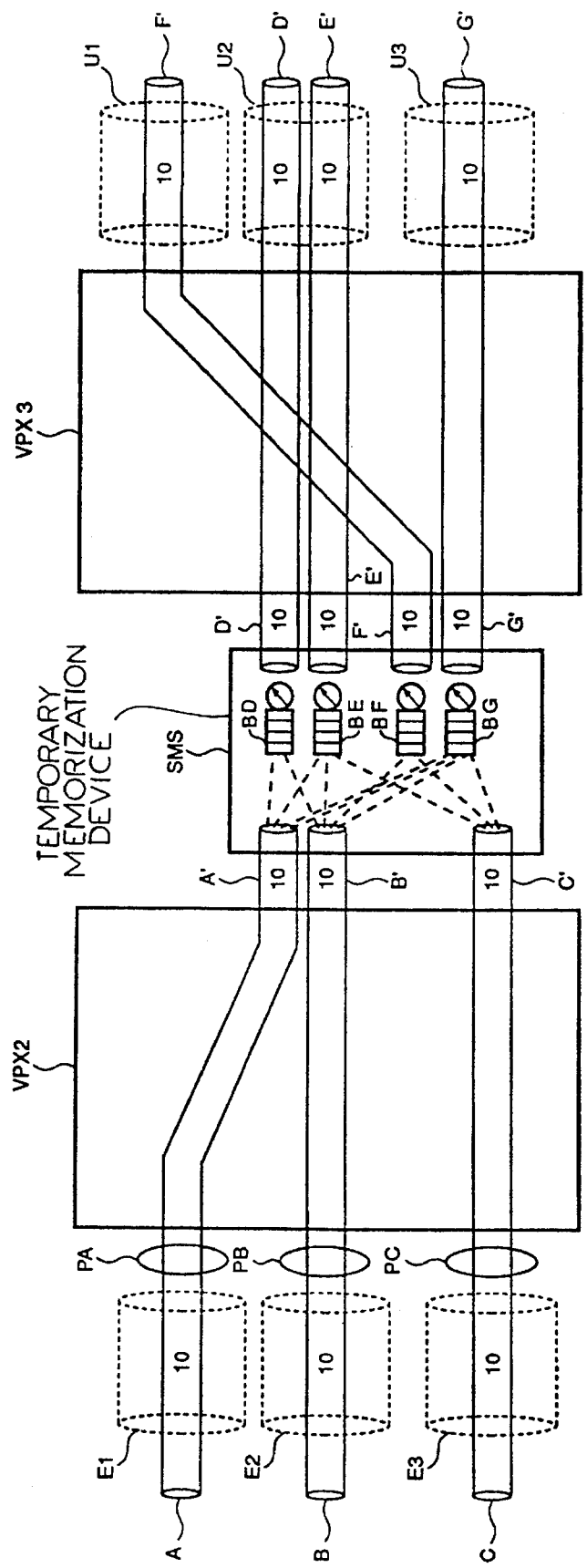
FIG. 3 is the logic diagram of a node in which the invention is applied.

FIG. 3 is a diagram of the operating principle of node N when utilizing the invention, assuming the same association virtual paths/physical lines and the same bandwidth allocation to the input and output virtual paths already examined in connection with FIG. 2. The elements also present in FIG. 2 are indicated with the same reference characters.

As can be seen, the cross-connection still requires a double pass through the node, as represented schematically by the two blocks VPX2, VPX3; moreover, before the second pass, the ATM flows are processed in a temporary memorization device or statistical multiplexing server SMS, which switches the virtual paths and also performs all bandwidth control functions and statistical multiplexing on the different data flows, forming outgoing virtual paths D', E', F', G' with the required bandwidth Wu. In the first phase the node behaves as a virtual path cross-connect and transfers incoming virtual paths A, B, C on the output ports to which device SMS is joined, while keeping unchanged the peak bandwidth assigned to the individual paths. Virtual paths outgoing from statistical multiplexing server SMS then make the second pass in the node, as in the previous case, in order to be cross-connected on the appropriate output link. Within server SMS, the packet queues for the different output virtual paths are shown schematically as BD, BE, BF, BG.

Figure 4:
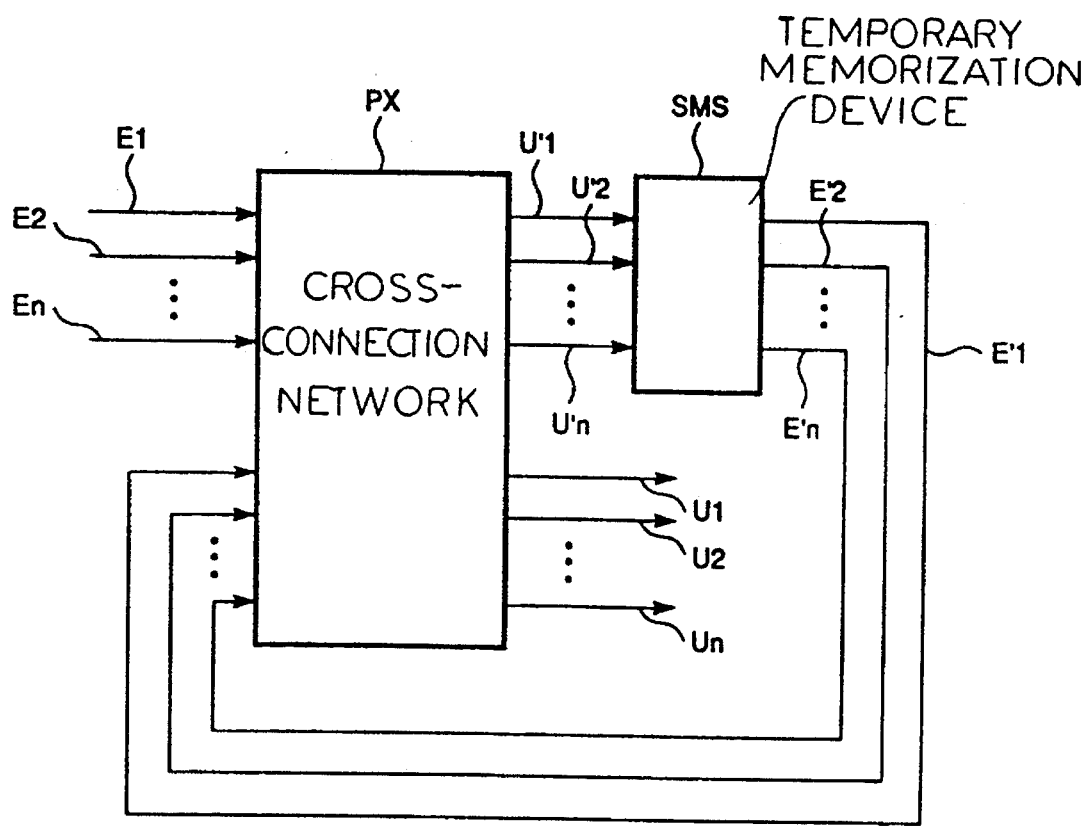
FIG. 4 is a constructive diagram of the node in FIG. 3.

FIG. 4 represents the connection of server SMS in a node. The node includes a connection network PX having two groups of input and output ports. A certain number of input links E1 ... En coming from other nodes and conveying virtual paths to be transferred over an equal number of output links U1 ... Un towards other nodes arrive at a first group of input ports. A second group of n output links U'1 ... U'n is connected to the inputs of server SMS, whose outputs are connected to links E'1 ... E'n which are brought back to the second group of inputs of PX. Thus, as an effect of the first cross-connection phase, traffic present on the input links is switched onto outputs U'1 ... U'n of the second group, to be processed in server SMS. The latter then forms the output virtual paths and inserts them onto links E'1 ... E'n which are then switched onto outputs U1 ... Un. The precise connections between inputs and outputs established within network PX, during each of the two phases, or within the SMS server, have no bearing on the comprehension of the invention.

Examining the tasks of server SMS more closely, it can be noted that it has essentially three functions:

1) to absorb any traffic peaks that may temporarily exceed the bandwidth Wu of an outgoing virtual path (thus, the server has a conventional buffer function);
2) to shape the cell flow on these paths: "shaping" means smoothing traffic peaks (with reference to bandwidth or time) and this is accomplished by scheduling the emission instants of the cells related to individual outgoing virtual paths in such a way as to guarantee an emission interval between consecutive cells that is not shorter than the one allowed for that path. Shaping could be accomplished in any of the ways described in the literature. However, in the present invention a solution is adopted which is based on allocating individual output virtual paths an overall bandwidth that is a multiple of an elementary bandwidth or quantum (for example 64 Kbit/s). Such solution shall be described below, with reference to FIG. 6 which shows the structure of server SMS;
3) to preserve the integrity of the flows at the message level and not at the cell level, by adopting a mechanism based on selective discard techniques for managing the buffers associated to individual virtual paths: in other words, keeping in mind that loss of a cell implies repetition of the message, in the presence of overload the attempt is made to concentrate losses over a number of messages that is as small as possible. This is achieved utilizing a threshold mechanism to accept arriving messages, described further on.

It is also possible that server SMS may be required to perform concentration functions. In the Figure, it is assumed that this element has only virtual channel switching functions.

The advantages of introducing the server and the switching procedures adopted according to the invention may be summarized as follows:

a shaping of the cell flows is determined which enables to handle even highly bursty traffic effectively, thereby realizing statistical flow multiplexing, reducing resources required in the network, avoiding possible congestion conditions in the downstream nodes and/or in particular at the destination node, etc.;

the selective discard functions at the message level protects the cell flow, seen from the destination, even in case of congestion, in particular in comparison with solutions based simply on indiscriminately discarding all cells when the buffer is full;

the solution offers the best responsiveness to situations of temporary congestion on outgoing virtual paths and the highest utilization of the allocated bandwidth;

impact on the node control structures is limited, because no specific protocols and management procedures are required; in any case introduction of the server is not incompatible with solutions like frm, which can be considered complementary and be optionally introduced for containing the occupation of the buffers inside the server by reducing cell delay times or for processing traffic having a more regular, connection-oriented profile;

finally, a virtual policing function is performed, avoiding peak bandwidth violations on outgoing virtual paths.

Figure 5:
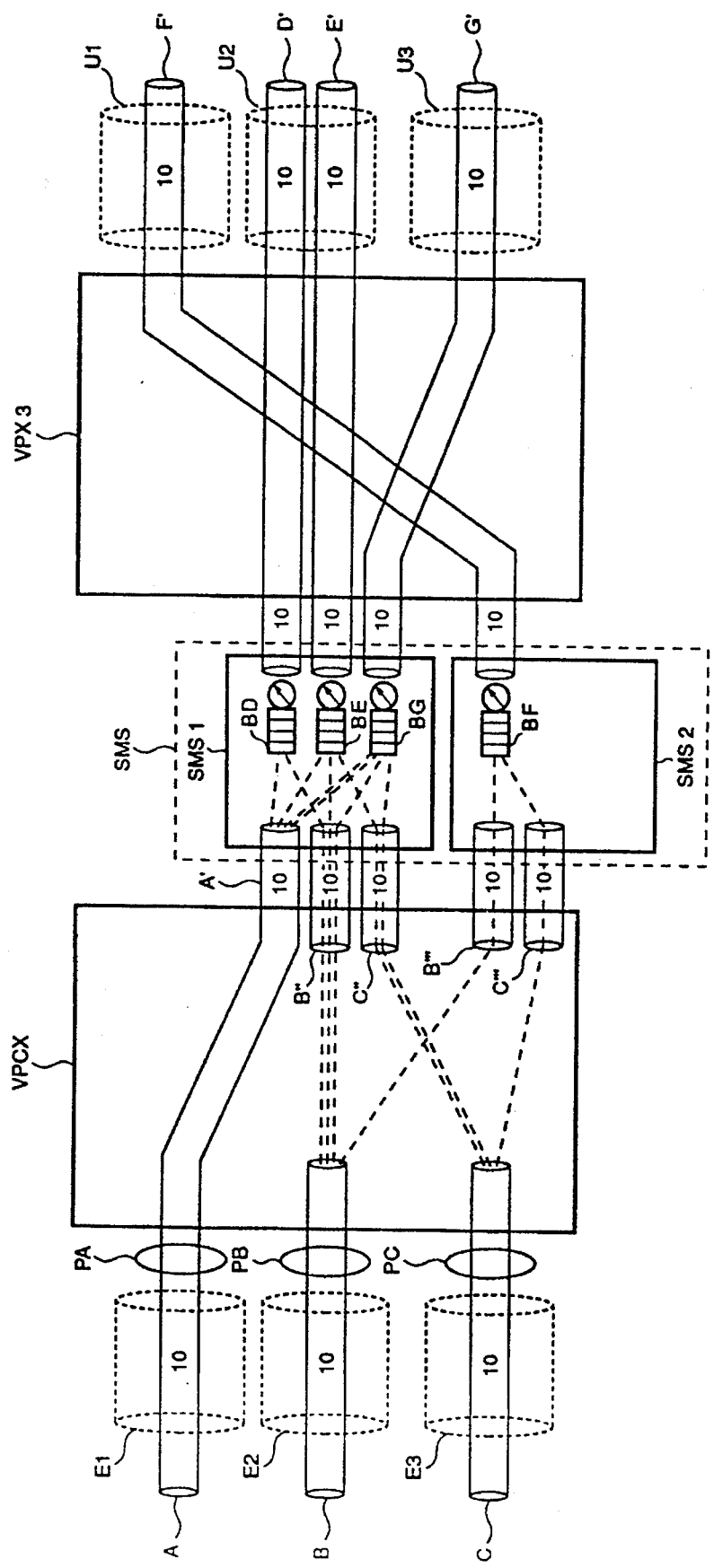
FIG. 5 is the diagram of a variant embodiment of the node in FIG. 3.

All incoming virtual paths including virtual channels that must be transferred to an output virtual path, and all outgoing virtual paths to which there are conveyed the virtual channels of a given incoming path must be present at the ports of server SMS. If the bandwidth of those outgoing channels exceeds the bandwidth available at the module output, the server will have to comprise several modules, each of them managing a part of the paths. An example of this possibility is represented in FIG. 5, where the server is composed of two modules SMS1, SMS2: virtual paths D', E', G' go out of SMS1, while virtual path F' goes out of SMS2. In these conditions in general a virtual path entering the node may include virtual channels that must be transferred to output virtual paths managed by different modules. For example, the Figure illustrates the case in which virtual channels B, C include channels directed towards output paths served by the two modules SMS1, SMS2. Therefore in the first pass inside the node it will also be necessary to cross-connect virtual channels so as to group the virtual channels directed towards distinct modules into distinct bundles having an aggregate peak bandwidth equal to that of the virtual path of origin. In the first phase, the node will therefore behave, in general, as a cross-connect VPCX for both virtual paths and virtual channels. In particular: virtual path A is still switched as a whole, since all its virtual channels are destined to virtual paths formed by SMS 1; for path B, part of its channels is switched so as to form an intermediate virtual path B" managed by SMS1 and a path B'" managed by SMS2; analogously, virtual path C originates virtual paths C", C'". As indicated in the Figure, each one of the paths B", B'", C", C'" is assigned a 10 Mbit/s bandwidth. In the two modules SMS1 and SMS2 of SMS, the virtual channels are cross-connected so as to form the four output virtual paths, as in the previous case. The second pass through the node again consists in the simply virtual path cross-connection, and therefore the second logic block in the node is again indicated by VPX3.

Figure 6:
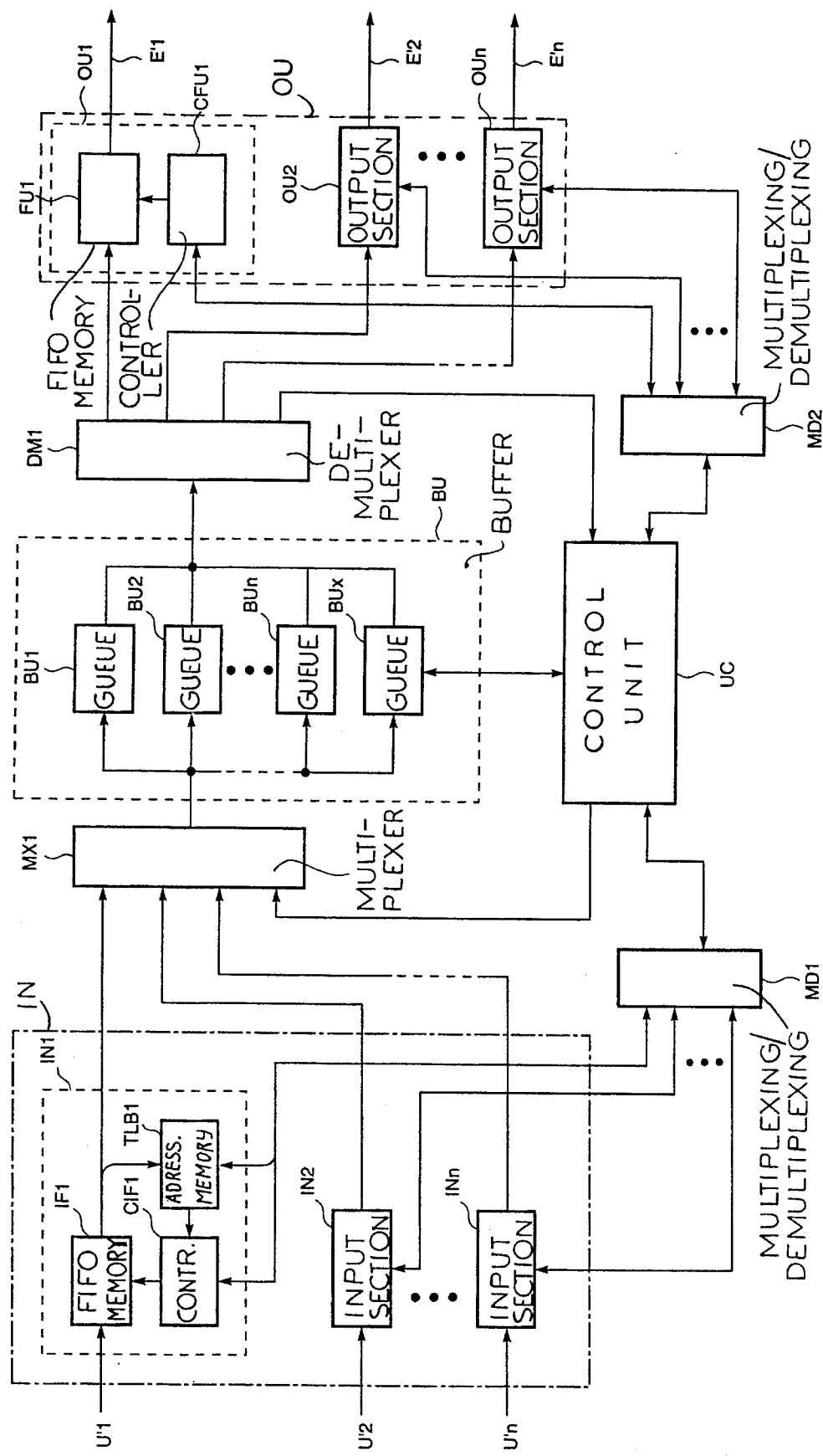
FIG. 6 is a block diagram of the server.

With reference to FIG. 6, server SMS essentially comprises an input section IN, buffer BU, control unit UC of buffer BU and an output section OU.

Input section IN comprises a number of elements IN1, IN2 . . . INn each connected to one of the lines U'1 . . . U'n. As indicated for IN1, each element comprises a FIFO memory IF1, with its respective controller CIF1, and an associative memory (for instance a content addressable memory) TLB1 which memorizes information related to the output virtual path to which the cell is associated (in particular an internal code identifying a virtual queue realized in BU and corresponding to such path) and a state information for the virtual channel to which the cell belongs, utilized for the selective discarding at the message level with the procedures that will be described further on. This information is provided by control unit UC through a first multiplexing-demultiplexing unit MD1 which in one direction allows supplying the content addressable memories and the controllers of the various input section elements with the information pertaining to them, and in the other direction allows transferring information from controllers CIF to unit UC. Memory IF1 and the corresponding memories in IN2 . . . INn temporarily store incoming cells for possible processing of the label field and for aligning and synchronizing flows with the internal time base of the device. The cells are then transferred from memory IF in the respective input section element INI . . . INn to memory BU through a first multiplexer MX1. An additional input of MX1 is connected to control unit UC to allow the latter to insert particular information flows for control and management purposes.

Controllers CIF carry out the usual functions necessary for writing and reading data into and from the memories of elements IN1 . . . INn. They also perform extraction and analysis of the cell header fields, needed to recognize the cell type and the virtual connection to which the cell belongs, in particular virtual path and virtual channel identifiers VPI/VCI, field PT containing payload type identifier PTI and field CLP (Cell Loss Priority). If label conversion to replace input identifiers VPI/VCI with the output identifiers has not been performed already by other units in the node, controllers CIF also carry out that operation. Information extracted by controllers CIF is then supplied to control unit UC.

Output section OU also comprises a number of elements OU1 . . . OUn, each connected to one of the output lines E'1 . . . E'n. As indicated for OU1, each element contains a FIFO memory FU1 and the respective controller CFU1, which performs dual functions of those of controllers CIF of the FIFO memories in IN, excepted extracting and analyzing outgoing cell fields, which is generally not strictly necessary. The cells to be written into the various memories FU of OU arrive from BU through a first demultiplexer DM1, which has an additional output for sending particular groups of cells to UC; a second multiplexing-demultiplexing unit MD2 allows information exchange between controllers CFU and UC.

Buffer BU is composed of a read/write memory, inside which service queues BU1 . . . BUn (some of which correspond to those indicated by BD . . . BG in FIGS. 3 and 5) related to individual output virtual paths are realized. A particular group of queues indicated by BUx is reserved to flows coming from or directed to control unit UC. Advantageously, the buffer is shared on all queues, which therefore are logic (or virtual) queues, and not physical queues. In other words it is not necessary to allocate memory areas to the individual queues in a static way.

Control unit UC is a processing unit specialized in effectively carrying out the intelligent management and control of BU. In particular UC manages, through a conventional list mechanism, the addresses of memory BU in order to realize and maintain virtual queues with the procedures required by the selective discarding and shaping technique adopted according to the invention.

In particular, as regards selective discarding, each virtual channel is managed by control unit UC as a state machine which can assume the following three states:

Idle: a channel is considered in in idle state after reception of an "end of message" cell, recognized by the information contained in Payload Type field PT present in the cell header according to standardized protocols (in particular, protocol AAL5, described in recommendation ITU-T I.363);

Accept: the channel passes to the "accept" state upon reception of a first cell related to it (which is recognized because such cell arrives during the idle state) provided the length of the service queue of the virtual path into which the cell is to be introduced is less than or equal to a certain threshold. The channel can also pass to such state, regardless of the queue length, if field CLP in the cell indicates a message to be served with higher priority. The channel remains in the accept state (and therefore the cells are admitted in the queue) until the end-of-message cell arrives; then, the channel returns to the idle state;

Reject: the channel passes to the reject state when, in correspondence with the first cell related to it received during the idle state, the length of the service queue of the virtual path into which the cell is to be introduced exceeds the threshold (unless the message has high priority, as stated above). In this condition, input cells from that channel are discarded until the end-of-message cell arrival, whereby the channel returns to the idle state.

Figure 7:
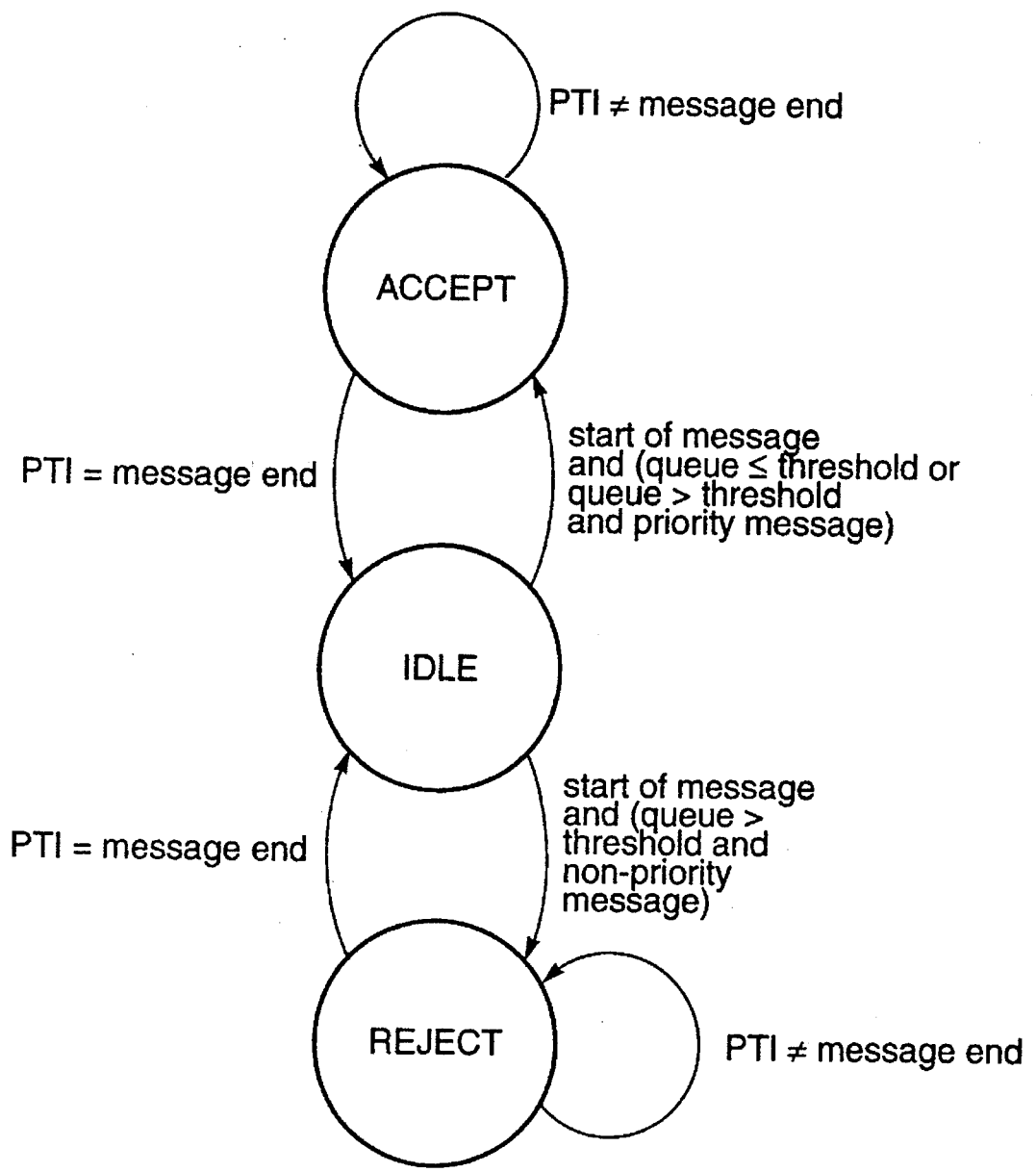
FIG. 7 is a state diagram related to the selective discarding algorithm.

This procedure is also illustrated in the state diagram in FIG. 7. Note that the description above assumes that the threshold is determined in such a way that, if the first cell of a message is accepted, then all subsequent cells are also accepted. For this reason no passage from the "accept" to the "reject" state is envisaged in the course of a message.

In addition to the acceptance threshold, it is also suitable to set a maximum limit to the sizes of the virtual path service queues, so as to prevent too long messages from clogging the entire buffer BU, damaging the queues of other virtual paths. This also limits cell wait in the server.

Regarding the shaping, as stated, the technique adopted is based on assigning the individual virtual paths, in the bandwidth negotiation phase, a bandwidth that is a multiple of a certain quantum. In such conditions it is possible to define the service of the various virtual paths according to a fixed frame subdivided into a number of slots or positions equal to the number of bandwidth quanta making up the entire bandwidth usable on the output link. Each virtual path is assigned the number of slots necessary to provide the required bandwidth to the path, and the slots will be distributed inside the frame in such a way that the cells of each virtual path are served with emission intervals that are as uniform as possible and that the cell delay variability caused by conflicts on the same service times is minimized. Building a frame simply entails realizing a memory table with the desired number of positions, each associated with the index of a virtual path to be served. Each slot in the frame corresponds to the emission time of a cell. The frame is scanned cyclically. The service frame is built only once for each group of virtual paths simultaneously active on a particular output of SMS and is modified only when a virtual path is released or inserted among the active ones.

From what has just been described, the operation of block SMS can be immediately deduced. When a cell enters IN, controller CIF of the memory involved extracts and analyzes the header fields containing identifiers VPI/VCI, identifier PTI (i.e. the contents of field PT) and the contents of field CLP. Through identifiers VPI/VCI, controller CIF reads in memory TLB the state (idle/accept/reject) of the channel to which the cell belongs and the information needed for the insertion into the appropriate virtual queue in BU. The internal identifier of the queue is sent to control unit UC which, for channels in accept state, determines on the basis of this identifier the insertion, into the appropriate list, of the address of the buffer into which the cell is to be written, in such a way as to determine the logic cell queueing in the associated virtual queue. The writing address for the cell has been previously written into TLB by UC which has taken it from the free ones, according to the usual queue management procedures. If the first cell of a channel in idle state is involved, control unit UC evaluates, by monitoring the queue length, whether it is necessary to temporarily disable storage of the cells of the incoming channel destined to the particular queue under consideration; in that case UC carries out, directly or through control logic IN, the configuration operations in memory TLB that are necessary to temporarily disable (modify to reject state) the cells destined to the aforesaid queue. Analogously, the channel under consideration will be enabled anew (thus its state will be changed to accept), when the length of the queue returns below the preset threshold.

To read the cells from the queues, UC examines the frame upon which the shaping of the queues associated with virtual paths is based, which frame, as stated, is stored in a suitable memory area. By reading the frame, UC derives information relevant to the virtual queue which has to be served in each operating cycle, and specifically the internal identifier of the virtual queue from which the output cell has to be transmitted. Consequently, UC sends to block OU involved, during each operating cycle, the address of the cell that has to be transmitted and, subsequently inserts again the address into the set of addresses of free locations inside BU.

It is evident that what has been described is provided solely by way of non-limiting example and that variations and modifications are possible without departing from the scope of the invention. In particular, although in the example described reference has been made to the case in which the peak bandwidth of all virtual paths is equal and remains constant throughout the node, the method and the device can be applied unchanged also in the more general case of a variable bandwidth.

We claim:

1. A method of cross-connecting variable-bandwidth data flows inside a cross-connect node of an ATM network, in which: data flows are composed of ATM cells transported along the network through virtual channels grouped into virtual paths; a peak bandwidth is assigned to the virtual paths during the set-up of the connection, and in correspondence with each node, traffic is policed at the node input and output, to prevent traffic coming from different virtual paths and directed to the same virtual path outgoing from the node from exceeding the node capacity, and traffic is also shaped, to make the emission of the cells related to a given virtual path as uniform as possible, said method comprising the steps of:

passing the flow of ATM cells in two consecutive passes through a connection network of the node, such that in a first pass virtual channels of input virtual paths are distributed among intermediate bundles of virtual channels each with an overall peak bandwidth equal to that of the virtual path of origin of the contributing channels, between the first pass and a second pass, a cross-connection of the virtual channels and a temporary memorization of the related cells are performed, by introducing the cells into service queues associated with the output virtual paths, together with a shaping of the cell flow to be associated with an output virtual path, and in the second pass the virtual paths are cross-connected, to multiplex output virtual paths on output lines of the node; and for the temporary memorization, accepting messages only if a threshold for the length of the respective queue has not been exceeded or, if the threshold has been exceeded, only if they are high priority messages, thereby performing a selective discarding process at the message level.

2. The method defined in claim 1 wherein selective discarding at the message level a state information is memorized for each channel, indicating three possible channel states including:

an idle state, which the channel assumes after the end of a message and while waiting for the first cell of a new message;

an accept state, which the channel assumes on receipt of the first cell of a message, if a length of the queue related to the output virtual path into which the message is to be inserted does not exceed the threshold or if the message is a high priority message, and in which the cells are admitted into the respective queue for further processing, the accept state being maintained until the last cell of the message is received; and a reject state, which the channel assumes on receipt of the first cell of a message if a length of the queue related to the output virtual path into which the message is to be inserted exceeds said threshold and the message is not a high priority message, and in which the cells are not routed to an output queue for further processing, the reject state also being maintained until the last cell of the message is received.

3. The method defined in claim 1 wherein to accomplish the shaping, an overall bandwidth that is a multiple of an elementary bandwidth is allocated to each active virtual path on a node output and the cells of the corresponding queue are read according to a traffic shaping frame formed by a number of time slots equal to the number of elementary bandwidths necessary to form the overall bandwidth.

4. The method defined in claim 3 wherein the traffic shaping frame is built only once for the respective group of simultaneously active virtual paths and is updated in correspondence with the release of one of the paths or with a set up of a new path.

5. The method defined in claim 1 wherein the temporary memorization and shaping are accomplished in a device inserted between the outputs and the inputs of the connection network of the node, which device receives all intermediate bundles of virtual channels and builds all virtual paths going out of the node, and in that the intermediate virtual channel bundles realized in the first cross-connection phase are obtained by cross-connecting the virtual paths entering the node.

6. The method defined in claim 1 wherein the temporary memorization and shaping are accomplished in a device that is connected between the outputs and the inputs of the connection network of the node and that includes a plurality of units each handling a part of the virtual channels going out of the node, and in that, for each such unit, the intermediate virtual channel bundles built in the first cross-connection phase are obtained by cross-connecting both virtual paths and virtual channels, in such a way that all virtual channels that are to be transferred to the output virtual paths served by a unit reach the unit itself.

7. A cross-connect node for an ATM network in which there are transmitted ATM cells carried along the network through virtual channels grouped into virtual paths, each path being assigned, during a connection set-up phase, a peak bandwidth, and the node including a connection network and server means to perform a temporary memorization of the cells to be routed on the output virtual paths and a traffic shaping, to make the emission of the cells related to a given virtual path as uniform as possible, wherein the server means for temporary memorization and traffic shaping are connected between a group of outputs and a groups of inputs of the connection network and are able to:

process ATM cell flows that have already undergone a first cross-connection phase, in the connection network, during which phase the virtual channels of the input virtual paths are distributed among intermediate virtual channel bundles each having an overall peak bandwidth equal to that of the virtual path of origin of the contributing channels;

cross connect the virtual channels to form shaped and policed shaped output virtual paths to be reinserted into the connection network, where they undergo a second cross-connection phase for being transferred over the node output lines; and perform traffic shaping at the virtual channel level by selectively discarding cells at the message level, whereby messages are accepted for insertion into service queues associated to the output virtual paths only if a length threshold for the respective queue has not been exceeded or, if it has been exceeded, only if the messages characterized have high priority.

8. The node defined in claim 7 wherein the server means includes at least one unit comprising:

a buffer means in which service queues associated with the different output paths are organized;

a unit control of the buffer means for managing such queues, said unit generating, on the basis of the queue length, a state information for each virtual channel indicating the possibility to accept or not to accept a message arriving on the channel itself, and building and managing a frame for outgoing traffic shaping;

a plurality of input elements, which are as many as node input/output lines are and comprise each: a FIFO memory for temporarily memorizing the cell flows that have undergone the first cross-connection phases; a content addressable associative memory, which memorizes information related to the output virtual path to which a received cell is to be routed and the state information of the virtual channel to which said cell belongs, supplied by the control unit of the buffer means; and a controller of the FIFO memory which, on the basis of the information contained in the associative memory, may control the routing of the buffer means, for insertion into the queues, only of cells belonging to high priority messages or to messages received over channels for which, in correspondence with the first cell of the messages, the state information indicates the possibility of accepting the message;

a number of output elements, each associated with an output line and comprising a FIFO memory and a FIFO memory controller, which controls the cell routing to the output line on the basis of the information about the shaping frame provided by the control unit of the memorization element.

9. The node defined in claim 8 wherein said buffer means are also arranged to organize queues related to cell flows to be routed to or supplied by the control unit.

10. The node defined in claim 8 wherein the buffer means is a shared resource and the serviced queues are virtual queues.

11. The node defined in claim 8 wherein the temporary memorization and shaping means comprise a single unit, and the connection network, in the first cross-connection phase, carries out a cross-connection at virtual path level.

12. The node defined in claim 8 wherein the temporary memorization and shaping means comprise a plurality of units, each managing a part of the node input and output virtual paths, and in each managing a part of the node input and output virtual paths, and in that the connection network, in the first cross-connection phase, groups the input virtual channels directed to virtual paths managed by distinct units into distinct bundles having an aggregate bandwidth equal to the bandwidth of the virtual path of origin.

13. The node defined in claim 8 wherein the temporary memorization and shaping means are able to allocate each active virtual path on a node output an overall bandwidth that is a multiple of an elementary bandwidth and to organize reading the service queues associated with the virtual paths simultaneously active on such output by reading the cells of the corresponding queue according to said frame, which is formed by a number of time slots equal to the number of elementary bandwidths necessary to form the overall bandwidth.

* * * * *